Nov. 18, 1930.     A. L. LEWIS     1,782,146
PORTABLE PLATFORM
Filed Nov. 17, 1926     2 Sheets-Sheet 1
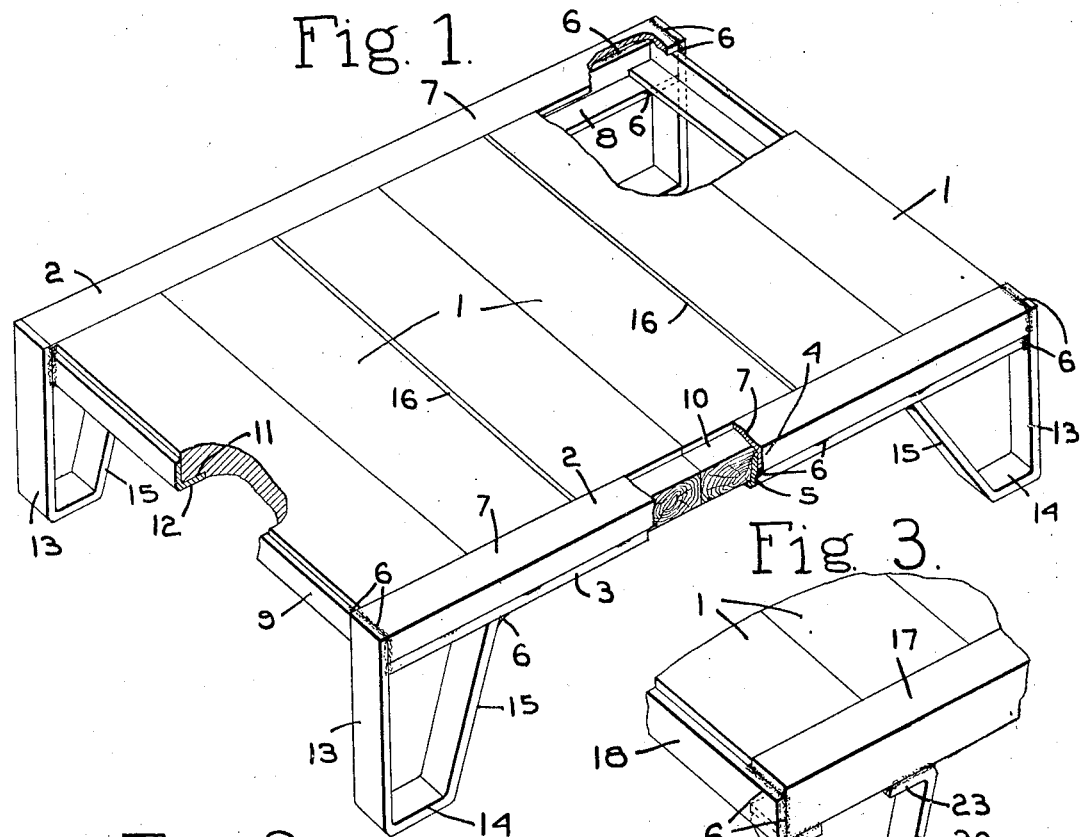
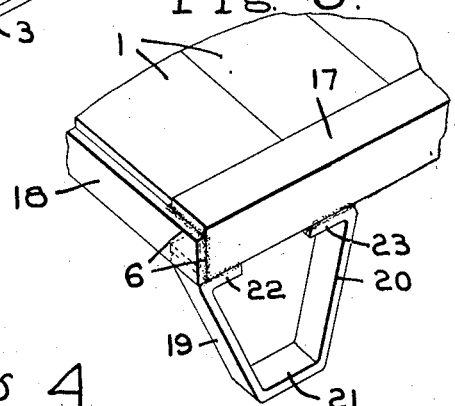
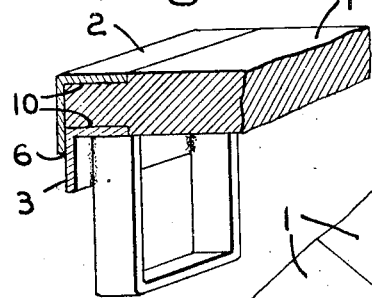
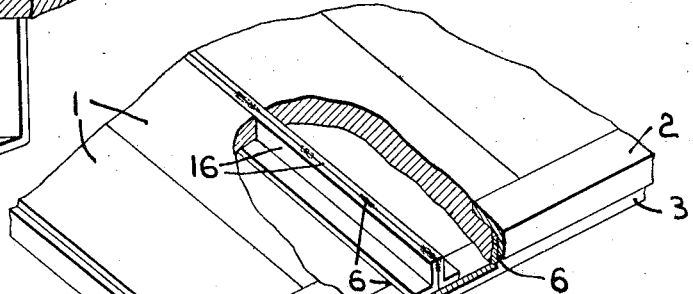
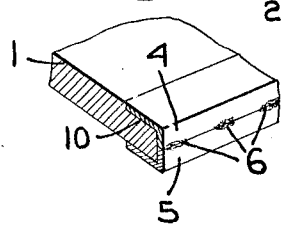
Inventor.
Arthur L. Lewis
by Heard Smith & Tennant.
Attys.

Nov. 18, 1930.                A. L. LEWIS                  1,782,146
                           PORTABLE PLATFORM
                         Filed Nov. 17, 1926        2 Sheets-Sheet 2
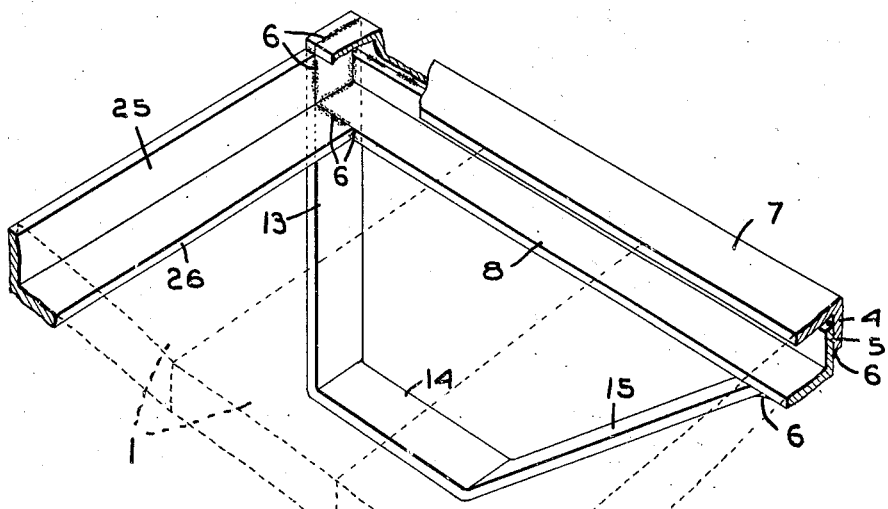
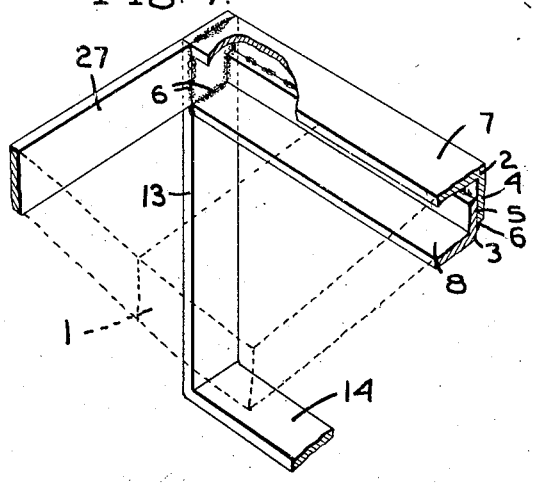
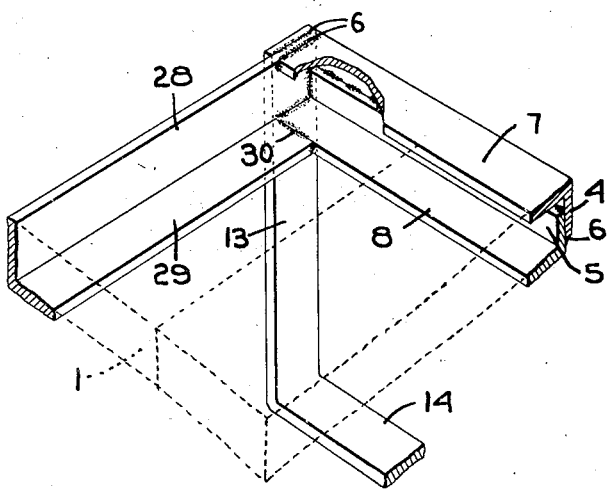
Inventor.
Arthur L. Lewis
by Heard Smith & Tennant.
                    Attys.

Patented Nov. 18, 1930

1,782,146

UNITED STATES PATENT OFFICE

ARTHUR LEM LEWIS, OF NEWTON CENTER, MASSACHUSETTS, ASSIGNOR TO LEWIS-SHEPARD COMPANY, OF WATERTOWN, MASSACHUSETTS, A CORPORATION OF MASSACHUSETTS

PORTABLE PLATFORM

Application filed November 17, 1926. Serial No. 148,913.

This invention relates to improvements in portable platforms of the type which are to be transported from place to place by elevating trucks and the object thereof is to provide a platform of novel rigid construction which can be economically manufactured.

More particularly the object of the invention is to provide a platform of the character above described having a frame comprising side members of channel shape to receive the ends of the floor members which are connected by transverse metal girders which are welded to said side members to form an integral structure.

A further object of the invention is to provide a platform in which the ends of the floor members are closely embraced by side members of channel shape or design and in which the front and rear ends of the floor are protected by transverse metal members which are welded to the channel bars.

A further object of the invention is to provide a frame of the type above described in which the side members are formed of associated angle bars having their vertical flanges overlapping and welded together to produce a channel of the required width to fit closely upon the ends of the floor members, whereby channels of any desired depth may be fabricated to fit upon floor members of different thicknesses.

A further object of the invention is to provide a frame of the character described with legs which are secured to the frame by welding and which preferably are welded both to the ends of the channel members and the transverse members.

A further object of the invention is to provide a platform of the character described in which the floor members are rabbeted to fit within the channel members so as to present an unobstructed plane surface flush with the upper surfaces of the side members. Desirably the end members of the floor have their under edges rabbeted to receive the flange of the angle iron transverse girders which are welded to the side members so that the lower face of the platform will likewise present a plane surface throughout the entire length of the platform.

Other objects and features of the invention will more fully appear from the following description and the accompanying drawings and will be particularly pointed out in the claims.

Illustrative embodiments of the invention are shown in the accompanying drawings, in which, Fig. 1 is a perspective view of a preferred form of platform, certain portions thereof being broken away to show more clearly the construction thereof;

Fig. 2 is a detail view in perspective and partly in section illustrating a different arrangement of fabricated channel bars than that illustrated in Fig. 1;

Fig. 3 is a detail view showing a modified form of platform in which the side members are of commercial channel bars, the transverse girders being in the form of flat plates;

Fig. 4 is a perspective view showing transverse girders located intermediate of the ends of the platform and also illustrating a different form of leg construction adapted to be employed;

Fig. 5 is a detail perspective view, partly in section, illustrating a channel bar construction in which the channel is formed by reversely arranged angle bars having their edges abutting;

Fig. 6 is a detail perspective view illustrating a modified arrangement of frame construction in which the girders are in the form of angle bars, the ends of which are abutted against and welded to the leg and horizontal girder of a fabricated channel bar;

Fig. 7 is a detail perspective view similar to Fig. 6 illustrating a transverse girder of flat metal stock welded at its end to the leg, the leg in turn being welded to the members of a fabricated girder of channel-bar construction; and, Fig. 8 is a similar view illustrating a modified construction in which the transverse girder is an angle bar, the lower flange of which is recessed at its end to receive the lower flange of the channel bar, the transverse girder being welded to the members of the channel bar and the leg in turn welded to the transverse girder.

The preferred embodiment of the invention illustrated in Fig. 1 comprises a series of floor members 1, such as planks, of any desired thickness. The ends of these floor members are embraced by a channel-bar construction in which the flanges of the channel are spaced apart such distance as to fit upon the ends of the floor members. Desirably these channels are fabricated from two angle bars 2 and 3 having their vertical flanges 4 and 5 overlapping and secured together by welding which is designated herein by the reference character 6. The edge of one of the overlapping vertical flanges can be readily welded to the face of the other overlapping flange by electric or other welding continuously throughout the entire edge, but preferably at such intervals as may be required to insure proper strength to the channel thus formed. By thus fabricating the side members which are to embrace the ends of the floor members, channels can be readily made of any desired width so that their horizontal flanges 7 and 8 will fit closely upon the upper and lower faces of the floor members. Each platform may, therefore, be readily constructed as an individual unit having a floor of the required length, and of such thickness as may be required to support the loads which are imposed upon it.

The channels, which embrace the ends of the floor members, are connected together by transverse girders 9 which are welded at their ends to the channel-bar side members to form an integral construction. In the preferred construction illustrated in Fig. 1 the transverse girders 9 are in the form of angle bars, the ends of which extend into the channels of the side members and are welded thereto. The ends of the floor members desirably are provided with rabbeted edges 10 which are recessed to such depth that the tops of the floor members will lie flush with the upper surfaces of the side members. The lower edges of the ends of the floor members likewise may be rabbeted so that the lower face of the floor will be flush with the surfaces of the lower flanges of the channels. By reason of this construction an elevating truck may be introduced either under the end of the platform or from the side of the platform without encountering any obstruction either during its introduction or removal. The floor members which form the ends of the platform desirably are provided with rabbets 11 on their under edges to receive the lower flanges 12 of the angle bar girders 9.

Suitable legs are provided to support the integral frame of the platform above described. In the preferred construction illustrated in Fig. 1 the legs are formed of flat bars bent into generally U-shape comprising vertical sections 13 which are respectively welded to the ends of the channel bars which form the side frames and also to the vertical flange of the transverse girder 9. The horizontal sections 14 of the U-shaped legs rest upon the floor and the inclined sections 15, which extend upwardly from the foot sections, abut at their upper ends against the under flanges of the channels and are welded thereto. By virtue of this construction the legs are secured firmly to the channels and to the cross girders and thereby strengthen the corners of the frame construction.

If desired other transverse girders may be employed to connect the side members intermediate of their ends. Such members desirably are in the form of angle bars 16 which may be used singly, as illustrated in Fig. 1, or back to back as illustrated in Fig. 4, with their ends resting upon the lower flanges of the channel-bar side members. These transverse girders are welded to the lower flanges of the channel bar and where two are used back to back, as illustrated in Fig. 4, the adjacent vertical flanges may be welded together if desired.

In the assembling of the construction illustrated in Fig. 1 the side frames may be first fabricated and the legs welded thereto with the vertical section 13 of the leg overlapping both the flanges and web of the channel bars and welded thereto. The floor may then be assembled with the transverse girders and when thus assembled the ends of the platform members forced into the channels of the side members and the transverse girders thereafter welded to the side members and preferably also to the legs. While it is desirable that two of the transverse girders shall be located at the ends of the floor to protect the floor members from injury it will be obvious that such members may be omitted where transverse girders of sufficient rigidity are employed intermediate of the ends of the platform as illustrated in Fig. 4.

In the construction illustrated in Fig. 1 the fabricated channel bars are formed by reversing the positions of the angle bars of which they are constructed so that the vertical flange of each angle bar extends toward the horizontal flange of the other and the overlapping portions of the vertical flanges are welded together. Other means may be employed for forming the channel bars, such as are illustrated in Fig. 2, in which the angle bars 2 and 3 are arranged in parallelism with the vertical flanges extending in the same direction from the horizontal flanges and the overlapping portions thereof welded together. In this construction, as in the other, the floor members 1 may be provided with both upper and lower rabbets 10 of sufficient depth to cause the surfaces of the floor members to lie flush with the outer surfaces of the horizontal flanges of the channel and thus to present a plane upper surface and an unobstructed lower surface at the ends of the floor.

While the side members desirably are formed of fabricated channels as above described, it is obvious that commercial channel bars of suitable size may be employed. A platform illustrative of such construction is shown in Fig. 3 in which the side members are of commercial channel bars 17. These channel bars may be connected by transverse girders of the character illustrative in Fig. 1, or any other suitable metallic transverse members, such as plates 18 which are welded at their ends to the ends of the channels. Such plates may be of any desirable width, but preferably are of such width as to be flush with the upper and lower surfaces of the floor members. In the construction illustrated in Fig. 3 a different form of U-shaped leg is shown comprising downwardly extending sections 19 and 20 which are connected by a foot section 21. The upper ends 22 and 23 of the sections 19 and 20 are bent into parallelism with the lower flanges of the channel bars and are welded to them and also if desired to the transverse end girders. Obviously the upper ends 22 and 23, or either of them, may be bent toward each other as illustrated, or one or both of them bent in the opposite direction as may be found desirable. Such a modified construction is shown in Fig. 4. In the construction illustrated in Fig. 4 the intermediate girders 16 form the main girders of the platform while the ends may be protected by flat plates 24 which desirably are welded at their ends to the ends of the channels.

In Fig. 5 a different form of channel-bar construction is illustrated in which the upper and lower angle bars 2 and 3 have their vertical flanges 4 and 5 abutting edge to edge and connected together by welding 6 continuously, or at such intervals as may be desirable to give the channel-bar sufficient strength.

Various other constructions may be employed, some of which are illustrated in Figs. 6, 7 and 8. In the construction illustrated in Fig. 6 the side members are of fabricated channel-bar construction and the vertical section 13 of the leg is welded directly to the ends of the channel bars. The transverse end girders are of angle iron, the ends of the vertical flanges 25 thereof being abutted against and welded to the vertical member 13 of the leg and the horizontal flange 26 being welded to the lower horizontal flange 8 of the channel bar.

In the construction illustrated in Fig. 7 the vertical members 13 of the leg abut against and are welded to the ends of the channel bars and the transverse members or girders are in the form of flat plates 27 which abut at their ends against the vertical sections 13 of the legs and are welded thereto.

In the construction shown in Fig. 8 the transverse end girders are in the form of angle bars. The vertical flange 28 extends across and is welded to the ends of the channel bar and the lower flange 29 is recessed to present edges 30 which abut against the edges of the lower horizontal flanges 8 of the channels and are welded thereto. In this construction the vertical sections 13 of the leg engage the outer faces of the vertical flanges 18 of the transverse girder and are welded to them. In this construction the leg may also be welded to the outer faces of one or both of the vertical flanges of the channel bar.

It will be readily understood that by reason of the constructions above described platforms of any size and having floor members of any desired thickness may be readily made. Furthermore, the platform frame thus fabricated is in effect integral and consequently of great strength and difficult to break even under the hard and careless usage to which such platforms are customarily subjected.

The front and rear edges of the platforms are protected by the transverse members of the frame from injury by the trucks which are pushed beneath them. Where the platform members are suitably rabbeted both the upper and lower faces of the floor members present flat surfaces which are unobstructed thus permitting the articles to be moved on and off of the platform without hindrance and also permitting the trucks to be introduced beneath and withdrawn from beneath the platform without obstruction. Desirably the platform is built of such length as to permit the entry of standard elevating trucks either from the ends or from the sides thereof, thereby providing a platform construction which is more easily handled than one which permits introduction of the truck only at the end. Where platforms are to be employed for transporting unusually heavy loads the supplemental transverse girders 12, which are located in proximity to the ends of the platform, are engaged by the truck, as well as the end girders, and resist the bending of the floor of the platform when it is raised from the floor.

By virtue of the constructions above described much labor is saved in the manufacture of platforms over the usual types in which the floor members were connected to the side frames by bolts and numerous braces employed to impart rigidity to the structure. The channel-bar side members of the platform which embrace the ends of the floor members of the transverse girders serve to prevent the displacement of the floor members without the necessity of employing bolts to secure the floor members to the side members as in previous constructions. The integral frame of the platform which is constructed by welding the horizontal girders at their ends to the transverse girders and particularly where the legs are welded both to the ends of the side members and to the transverse girder forms a construction of such great rigidity that lighter stock may be employed to produce a platform of the same load supporting capacity as previous platforms of the same size.

Many other advantages of the constructions described herein will be obvious to those skilled in the art.

It will also be understood that the embodiments of the invention particularly described herein are illustrative in character and are not restrictive and that various changes may be made in form, construction and arrangement of parts within the spirit and scope of the following claims.

Having thus described the invention, what is claimed as new, and desired to be secured by Letters Patent, is:

1. A portable platform comprising floor members, side members of channel shape fabricated from associated angle bars having their vertical flanges welded together longitudinally in such manner as to cause the horizontal flanges thereof closely to engage the upper and under faces of the end portions of the floor members and transverse metal girders welded to the respective ends of the channel bars to provide an integral frame and to protect the ends of the floor.

2. A portable platform comprising floor members, side members of channel shape embracing the ends of said floor members, transverse metal girders connected to the respective ends of said channel bars by welding to provide an integral frame and legs extended downwardly from and welded to the ends of the respective channels and also welded to the transverse end girders.

3. A portable platform comprising floor members, side members of channel shape embracing the ends of said floor members, fabricated from associated metal angle bars having their horizontal flanges engaging respectively the upper and under faces of said floor members and their vertical flanges overlapped and welded together and transverse metal girders welded at their ends to the respective channels to form an integral frame.

4. A portable platform comprising floor members, side members of channel-bar construction embracing the ends of the floor members formed of associated angle bars having their vertical flanges over-lapped sufficiently to cause their horizontal flanges to engage respectively the upper and under faces of said floor members with said vertical flanges welded together at intervals along the overlapped edges, U-shaped legs underlying and welded to the lower flanges of the channel bars and transverse angle-bar girders welded at their ends to the respective channel bars embracing and protecting the lower edges of the end floor members.

5. A portable platform comprising floor members, side members of channel-bar construction, embracing the ends of said floor members, formed of structural steel angle bars and having their horizontal flanges engaging respectively the upper and under faces of said floor members and their vertical flanges overlapped and welded together, transverse structural steel angle bars embracing the lower front and rear edges respectively of the floor, welded at their ends to said channel bars, and legs comprising respectively flat plates bent to present a vertical section, a horizontal foot section and an inclined bracing section, the vertical sections being welded to the respective ends of the channels and to the transverse angle bars and the ends of the inclined sections being welded to the under faces of the horizontal flanges of the respective channel bars.

6. A portable platform comprising an integral frame formed of side members of channel-bar construction reversely arranged to present floor-receiving recesses, transverse girders of angle iron having their ends extended into said recesses with their horizontal flanges resting upon the upper surfaces of the lower flanges of said channel bars and welded thereto, wooden floor members having their ends rabbeted to fit within said channels to present a floor surface flush with the upper surfaces of said side channels, the floor members being also rabbeted to receive the lower flanges of said angle bar girders.

7. A portable platform comprising an integral frame formed of side members of channel-bar construction reversely arranged to present floor-receiving recesses, transverse end girders of angle iron having their ends extended into said recesses with their horizontal flanges resting upon the upper surfaces of the lower flanges of said channel bars and welded thereto, wooden floor members having their ends rabbeted to fit within said channels to present a floor surface flush with the upper and lower surfaces of said side channels respectively, the end floor members being also rabbeted to receive the lower flanges of said angle-bar girders, whereby the upper and lower surfaces of said platform will present uninterrupted plane surfaces and the edges of the ends of the floor protected by said transverse girders, and legs having their ends welded to the under faces of said channels and to said transverse end girders.

8. A portable platform comprising floor members, side members of channel bar construction embracing the ends of the floor members formed of associated angle bars having their horizontal flanges engaging respectively the upper and under faces of said floor members and their vertical flanges overlapped and welded together, transverse angle bar girders welded at their ends to the ends of the respective channel bars, and U-shaped legs each welded at one end to the lower flange of a channel bar, and at the other end extending across the end of the channel bar and welded thereto, and also to the adjacent transverse girder.

9. A portable platform comprising an integral frame formed of side members of channel bar construction respectively arranged to present floor receiving recesses, transverse end girders of angle iron having their ends extended into said recesses with their horizontal flanges resting upon the upper surfaces of the lower flanges of said channel bars and welded thereto, wooden floor members having their ends rabbeted to fit within said channels to present a floor surface flush with the upper and lower surfaces of said side channels respectively, the end floor members being also rabbeted to receive the lower flanges of said angle bar girders whereby the upper and lower surfaces of said platform will present uninterrupted plane surfaces and the edges of the ends of the floor protected by said transverse girders and legs having their ends welded to said channels and to said girders.

10. A side frame construction for portable platforms comprising a channel shaped member fabricated from associated angle bars having their vertical flanges overlapped sufficiently to cause their horizontal flanges to engage the upper and under faces of the end portions of the floor members to be employed, and U shaped legs extending downwardly from the lower flanges of said fabricated channel; each having one end overlapping an end of the channel shaped member and welded thereto and the other end welded to the lower flange thereof at a distance from said channel bar end.

In testimony whereof, I have signed my name to this specification.

ARTHUR LEM LEWIS.